(12) United States Patent
Bagschik et al.

(10) Patent No.: US 11,338,825 B2
(45) Date of Patent: May 24, 2022

(54) AGENT BEHAVIOR MODEL FOR SIMULATION CONTROL

(71) Applicant: Zoox, Inc., Foster City, CA (US)

(72) Inventors: Gerrit Bagschik, Foster City, CA (US); Andrew Scott Crego, Foster City, CA (US); Mahsa Ghafarianzadeh, Emerald Hills, CA (US); Siavosh Rezvan Behbahani, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 28 days.

(21) Appl. No.: 16/889,747

(22) Filed: Jun. 1, 2020

(65) Prior Publication Data

US 2021/0370972 A1    Dec. 2, 2021

(51) Int. Cl.
| | |
|---|---|
| *B60W 60/00* | (2020.01) |
| *B60W 50/00* | (2006.01) |
| *B60W 50/08* | (2020.01) |
| *B60W 50/04* | (2006.01) |

(52) U.S. Cl.
CPC .... *B60W 60/0011* (2020.02); *B60W 50/0097* (2013.01); *B60W 50/045* (2013.01); *B60W 50/085* (2013.01); *B60W 2050/046* (2013.01); *B60W 2556/10* (2020.02)

(58) Field of Classification Search
CPC ......... G05D 1/0088; G05D 2201/0213; G05D 1/0212; G05D 1/0214; G05D 1/0246; G05D 1/0221; G05D 1/0257; G05D 1/0274; G05D 1/0278; G05D 1/0231; G05D 1/0223; G05D 1/024; G05D 1/021; G05D 1/027; G05D 1/0238; G05D 1/0217; G05D 2201/0212; G05D 1/0248; B60W 60/0011; B60W 50/045; B60W 50/0097; B60W 50/085; B60W 2050/046; B60W 2556/10
See application file for complete search history.

(56) References Cited

U.S. PATENT DOCUMENTS

| | | | | |
|---|---|---|---|---|
| 4,735,274 | A | * | 4/1988 | Good ................. B62D 15/0285 180/204 |
| 5,160,239 | A | * | 11/1992 | Allen ...................... E02F 3/437 172/4.5 |
| 5,742,141 | A | * | 4/1998 | Czekaj ............... B62D 15/0285 180/199 |
| 2010/0191391 | A1 | | 7/2010 | Zeng |
| 2015/0266488 | A1 | | 9/2015 | Solyom et al. |
| 2018/0365888 | A1 | | 12/2018 | Satzoda et al. |

OTHER PUBLICATIONS

PCT/US2021/035248 Filed Jun. 1, 2021; PCT Search Report and Written Opinion dated Aug. 19, 2021, 9 pages.

* cited by examiner

*Primary Examiner* — Ian Jen
(74) *Attorney, Agent, or Firm* — Lee & Hayes, P.C.

(57) ABSTRACT

Simulating realistic movement of an object, such as a vehicle or pedestrian, that accounts for unusual behavior may comprise generating an agent behavior model based at least in part on output of a perception component of an autonomous vehicle and determining a difference between the output and log data that includes indications of an actual maneuver of location of an object. Simulating movement of an object may comprise determining predicted motion of the object using the perception component and modifying the predicted motion based at least in part on the agent behavior model.

20 Claims, 6 Drawing Sheets

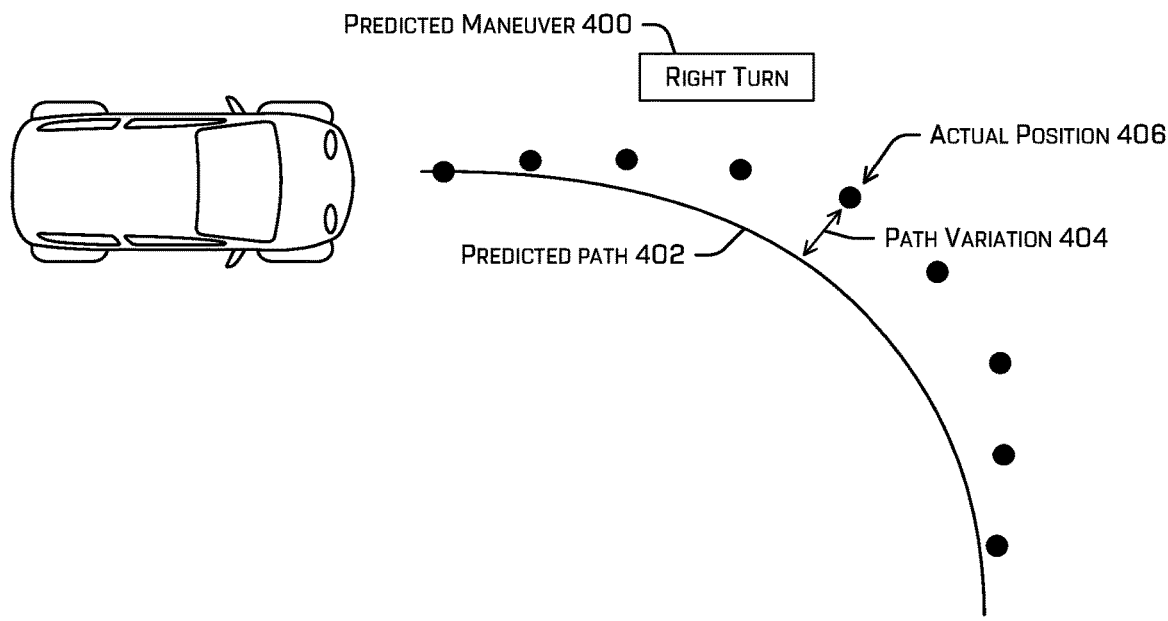
FIG. 4A
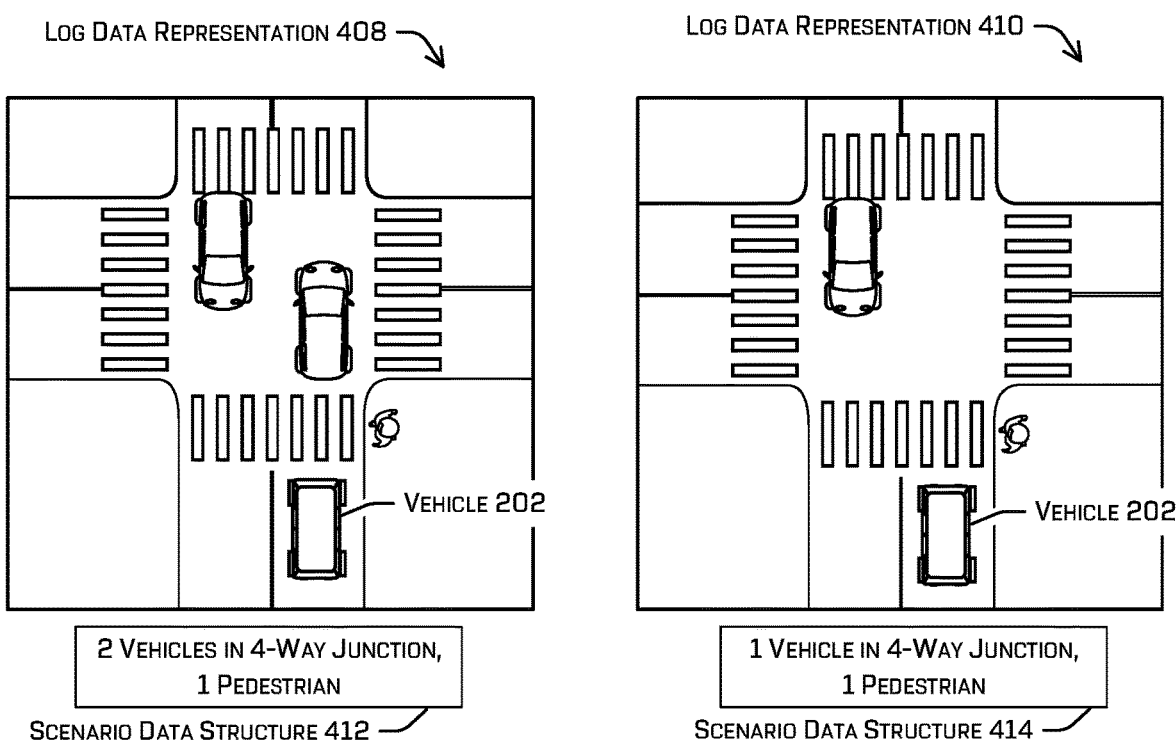
FIG. 4B
FIG. 4C

AGENT BEHAVIOR MODEL FOR SIMULATION CONTROL

BACKGROUND

Running simulations of scenarios may provide a valuable method for testing autonomous systems and/or machine-learned model pipelines, such as those incorporated in autonomous vehicles. However, human behavior may be unpredictable and it may therefore be difficult to accurately identify and model infrequent anomalous behavior. For example, a human driver may suddenly swerve off a highway onto an off-ramp, make a turn in front of oncoming traffic, turn on a red light at an intersection where such a turn is illegal, etc.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 4A illustrates an example predicted maneuver and an example actual path/actual maneuver taken by the object that was the subject of the prediction.

FIGS. 4B & 4C illustrate example scenarios and scenario labels that may be associated with different error models.

DETAILED DESCRIPTION

Figure 1:
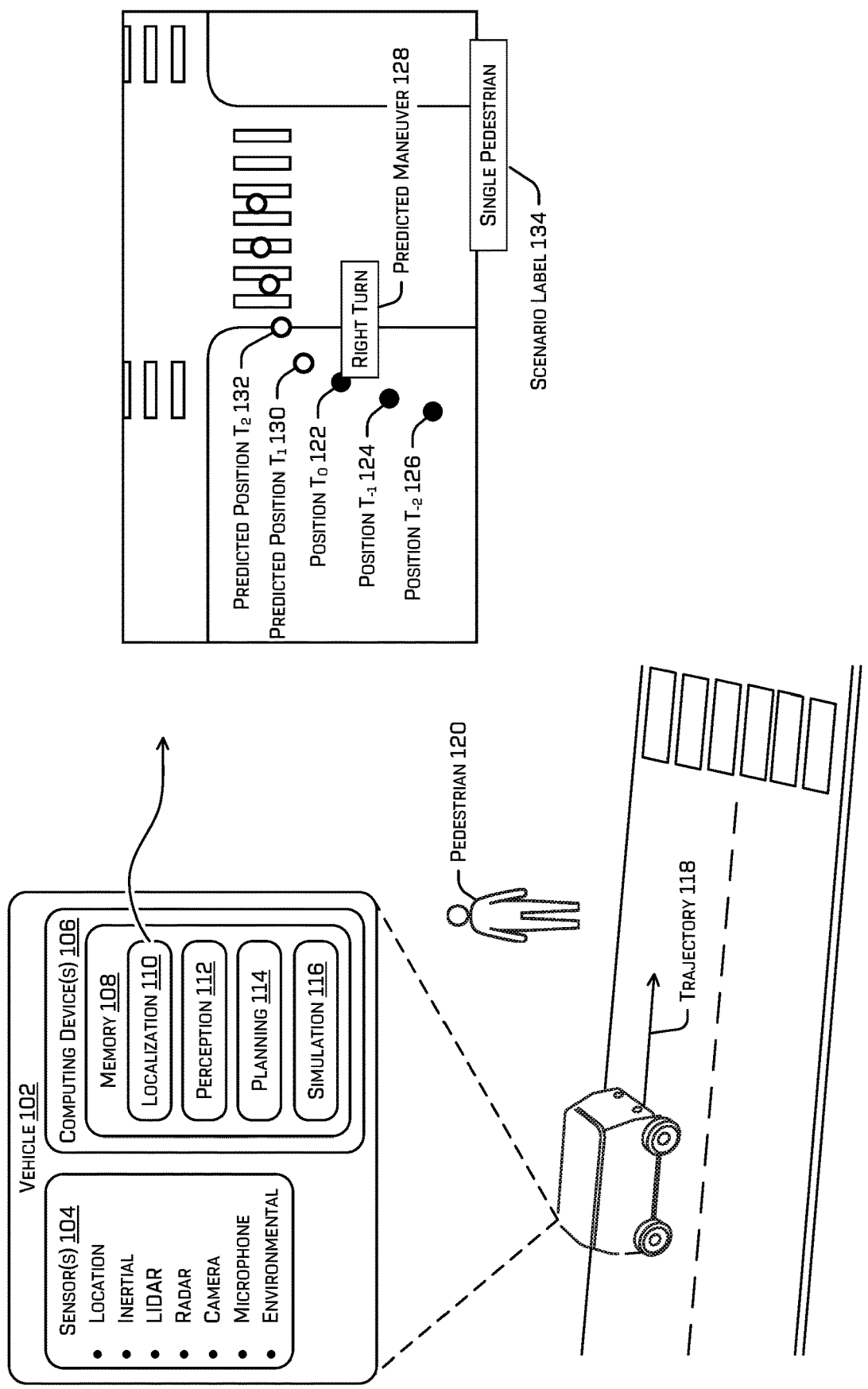
FIG. 1 illustrates an example scenario in which an autonomous vehicle may be controlled based at least in part on prediction data generated by a perception component based at least in part on sensor data collected by one or more sensors associated with an autonomous vehicle.

Techniques for accurately simulating behavior of objects, such as vehicles, pedestrians, cyclists, or animals, may comprise generating an agent behavior model that may determine instructions for controlling a simulated object, such as a simulated representation of a dynamic object (i.e., an object capable of movement, such as a vehicle, pedestrian, cyclist, animal) in a simulated environment. The agent behavior model may be designed to imitate the way dynamic objects may, from time to time, exhibit anomalous behavior. For example, the agent behavior model may cause a simulated vehicle to execute a turn in front of oncoming traffic, swerve suddenly, cross lane markings, execute an illegal maneuver, move at an unlawful speed, and/or the like at a frequency similar to rates at which such things occur in real-world scenarios. Simulating this aberrant behavior using the agent behavior model may improve tests of an autonomous vehicle's response to objects in the environment surrounding the autonomous vehicle.

An autonomous vehicle may comprise a perception component that receives sensor data from one or more sensors associated with the autonomous vehicle. The perception component may use the sensor data to determine perception data that may indicate what is in the environment and predictions of what the state of the environment will be in the future. For example, the perception data may indicate that an object exists in the environment, where the object exists and its classification (e.g., vehicle, pedestrian, signage, static object, cyclist), and prediction data associated with the object indicating a predicted position, heading, and/or velocity of the object at a future time and/or a maneuver that the object may make. The predicted maneuver may be a high-level description of the action taken by an object, such as, maintaining a state of the object (e.g., maintaining a stopped position, maintaining a trajectory), executing a left turn, stop, or lane change; entering or exiting a roadway, crosswalk, sidewalk, or a segregated lane (e.g., a bike lane, a high-occupancy vehicle lane); and/or the like.

Generating the agent behavior model may include receiving perception data and log data associated with a scenario from an autonomous vehicle that navigated through the scenario. The log data may comprise sensor data and/or perception data collected/generated during the autonomous vehicle's operation during the scenario. In some examples, the log data may further include labels added after the autonomous vehicle has transmitted the perception data and/or sensor data to a remote computing device. The labels may indicate ground truth regarding objects that appear in the sensor data.

The techniques may comprise determining a difference between the prediction data and the log data and constructing an error model based on the difference determined in associated with multiple same or similar scenarios. For example, the techniques may comprise a pre-processing operation that include identifying different scenarios in the log data and/or perception data associated therewith. A scenario may comprise a layout of the environment (e.g., four-way controlled intersection, three-way uncontrolled intersection, six-way atypical controlled intersection, two-lane highway, one-way direction of travel) a number, type, and/or configuration of objects in the scenario. The configuration may identify a position, orientation, and/or trajectory/velocity of the objects. The techniques may comprise aggregating the log data and perception data associated with a same scenario from log data and perception data received from one or more autonomous vehicles over a data-gathering time period. The error model may progressively be built as new log data and/or perception data associated with a scenario is added to the aggregation (or at one time over all the aggregated data). In some examples, an error model may be determined per scenario, per object type, and/or per object position/orientation/state in a scenario.

The techniques may comprise constructing different types of error models. In at least one example, the techniques may comprise determining a maneuver error model and a path error model. The maneuver error model may be generated based at least in part on a difference between a maneuver predicted by the perception component of the autonomous vehicle and an actual maneuver executed by an object as indicated by the log data. The path error model may be generated based at least in part on a difference between a path predicted by the perception component and the actual path taken by an object (e.g., a Euclidean distance between a predicted position and the actual position). The path may be a sequence of predicted positions and/or trajectory followed by the object. In either case, the error model may comprise a probability distribution associated with different maneuvers/paths. For example, a maneuver error model may indicate a probability distribution of a vehicle maintaining its state (e.g., continuing to drive straight ahead) in a first scenario where the vehicle is located in the middle of an intersection and is moving straight through the intersection. The maneuver error model may indicate a probability that a vehicle will swerve left, swerve right, suddenly stop, or continue its trajectory based on the scenario, object type, object position/heading/velocity in the environment, and/or state of the vehicle (e.g., executing turn, stopped). For example, the techniques may comprises determining a number of times that an object makes a maneuver and/or that the maneuver made by the object matches the predicted maneuver, as observed over multiple instances.

The error models generated for an object type—e.g., vehicle, pedestrian—over the different scenarios may be associated with the object type as the agent behavior model for that object type. This agent behavior model may be called from memory when an object of that type is instantiated in a simulation. For example, the techniques may comprise receiving a scenario, which may be defined based at least in part on map data, log data received from an autonomous vehicle and/or based at least in part on input received at a computing device (e.g., an individual may interact with a user interface of the computing device to define the scenario). In some examples, the scenario may indicate characteristics of the environment such as, for example, a position, orientation, movement, and/or characteristics (e.g., materials, height, width, depth, luminance) of one or more objects. For example, the environment may comprise one or more static objects and/or one or more agents (e.g., dynamic objects) in a configuration specified by the scenario that is to be simulated. In some examples, any of the dynamic objects instantiated in the scenario may be controlled based at least in part on the output of an agent behavior model.

In some examples, controlling the simulated behavior of an object using the agent during the simulation may comprise determining prediction data associated with the object based at least in part on simulated sensor data received by a perception component of the autonomous vehicle. This perception component may be a copy or virtualization of the perception component that runs on the autonomous vehicle. The perception component may output prediction data associated with the simulated object; the prediction data may be received by the agent behavior model. In some examples, the prediction data may comprise at least a predicted maneuver and/or a predicted path of the simulated object. The agent behavior model may modify the predicted maneuver and/or the predicted path of the simulated based at least in part on error model(s) associated with the simulated object.

For example, modifying the predicted maneuver and/or the predicted path may comprise sampling the error model(s) and altering the predicted maneuver and/or the predicted path based at least in part on a probability associated therewith. The techniques may comprise controlling motion of the simulated object based at least in part on the modified maneuver and/or the modified path. Modifying the maneuver may result in changing the maneuver and modifying the path may comprise modifying parameters of a curve defining the path or increasing a variance associated with discrete position's locations from a reference curve (e.g., the reference curve may be defined by the predicted maneuver). For example, the simulated object may be predicted to continue straight and only move mildly laterally from a straight path defined by a "straight" maneuver, but sampling the maneuver error model may result in a low-probability event where the simulated object executes a hard right turn while maintaining the same velocity and varying greatly in a lateral displacement from a path associated with a hard right turn. In some examples, a maneuver model may indicate a probability associated with a maneuver—for example, the maneuver model may indicate different maneuvers that may be possible and different probabilities associated with the different maneuvers indicating a probability the respective maneuver will be executed by the object (and may be based on the error of the perception system, as discussed further herein). For example, the maneuver model may indicate different maneuvers that an object may execute and probabilities associated therewith that, together, sum to 1. Other manners of proportioning probability are contemplated, such as percentages (which may or may not sum to 100% over all possible next maneuvers), and/or the like.

In an additional or alternate example, the simulation may run simulations of a scenario multiple times and the techniques may comprise tracking an occurrence rate of maneuver(s) and/or path(s) associated with an object. In such an instance, modifying a predicted maneuver and/or predicted path may comprise changing the maneuver and/or predicted path to conform to an occurrence rate determined based at least in part on error model(s) associated with the object and/or scenario. For example, a maneuver error model may indicate that once in every 1,000 iterations of a scenario where a vehicle is moving through an intersection the vehicle makes a hard turn in front of oncoming traffic. The agent behavior model may enforce an occurrence rate that ensures that once in every 1,000 iterations the predicted maneuver is modified to include a hard turn in front of oncoming traffic.

The techniques discussed herein may be used to test operation of an autonomous vehicle (e.g., a planning component of an autonomous vehicle), which may generate a trajectory for controlling operation of the autonomous vehicle based at least in part on simulated sensor data associated with the simulated motion of an agent. The perception data produced by the perception component may also be provided to the planning component for testing the planning component.

The techniques may improve the testing and/or training of one or more components of the autonomous vehicle (e.g., a localization component, a perception component, a planning component) and may thereby improve the accuracy thereof and the safety and efficacy of operation of the autonomous vehicle (or any other system that integrates such a perception component and/or planning component). Moreover, the techniques may reduce the amount of computing resources needed to accurately simulate a scenario since the effectively use the perception component of the autonomous vehicle itself to control the simulation, modified by the agent behavior models, which may require significantly less computational power than the perception component.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a localization component 110, a perception component 112, a planning component 114, and/or a simulation system 116. In general, localization component 110 may comprise software and/or hardware system(s) for determining a pose (e.g., position and/or orientation) of the vehicle 102 relative to one or more coordinate frames (e.g., relative to the environment, relative to a roadway, relative to an inertial direction of movement associated with the autonomous vehicle). The localization component 110 may output at least part of this data to the perception component 112, which may output at least some of the localization data and/or use the localization data as a reference for determining at least some of the perception data.

The perception component 112 may determine what is in the environment surrounding the vehicle 102 and the planning component 114 may determine how to operate the vehicle 102 according to information received from the localization component 110 and/or the perception component 112. The localization component 110, the perception component 112, and/or the planning component 114 may include one or more machine-learned (ML) models and/or other computer-executable instructions.

In some examples, the localization component 110 and/or the perception component 112 may receive sensor data from the sensor(s) 104 and/or simulated data from simulation system 116. The techniques discussed herein may comprise adding simulation data received from the simulation component 116 to perception data output by the perception data 112, thereby improving the online prediction of possible agent behaviors. For example, the simulation system 116 may generate modified maneuvers and/or modified paths using the agent behavior model(s) discussed herein and provide the modified maneuvers and/or modified paths the planning component 114 and/or the perception component 112 in at least one example.

In some instances, the perception component 112 may determine data related to objects in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. In some examples, the objects surrounding the vehicle 102 may be simulated objects of a simulated environment. The data produced by the perception component 112 may be collectively referred to as "perception data." Once the perception component 112 has generated perception data, the perception component 112 may provide the perception data to the planning component 114.

The planning component 112 may determine trajectory 118 based at least in part on the perception data and/or other information such as, for example, simulation data generated by the simulation system 116 (e.g., modified maneuvers and/or paths) and/or localization data (e.g., where the vehicle 102 is in the environment relative to a map and/or features detected by the perception component 110). For example, the planning component 114 may determine a route for the vehicle 102 from a first location to a second location; generate, substantially simultaneously and based at least in part on the perception data and/or the simulated perception data, a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 that the vehicle 102 may use to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for a PID controller, which may, in turn, actuate a drive system of the vehicle 102. For example, the trajectory 118 may comprise instructions for controller(s) of the autonomous vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated). The trajectory 118 may comprise a target heading, target steering angle, target steering rate, target position, target velocity, and/or target acceleration for the controller(s) to track.

The example scenario 100 includes a pedestrian 120 that is walking on a sidewalk next to a roadway in which the vehicle 102 is operating. The perception component 112 may receive sensor data associated with the environment and determine a position of the pedestrian 120 in the environment and a classification associated with the pedestrian 120 (i.e., "pedestrian"). Perception data generated by the perception component 112 may be stored in a log data store, which may comprise the position of pedestrian 120 at a current and previous time steps. For example, FIG. 1 depicts a current position 122 at time $t_0$ of the pedestrian 120 and previous (historical) positions of the pedestrian, i.e., position 124 at time $t_{-1}$ and position 126 at time $t_{-2}$. Each time step may correspond to an interval of time (e.g., 100 milliseconds, 500 milliseconds, 1 second, any other portion of time). In at least one example, the positions 122-126 and the object classification may be associated as part of a track generated by the perception component 112.

In the example scenario 100 the perception component 112 may determine a predicted maneuver 128 and/or a path of the pedestrian 120 based at least in part on the position 122, historical position(s) 124 and/or 126, the object classification, and/or other data associated with the pedestrian 120. FIG. 1 depicts the path as discrete positions, including predicted position 130 at time $t_1$ and predicted position 132 at time $t_2$. Current and historical positions are depicted as solid circles (such as first detection 313(a) and second detection 313(b) in FIG. 3) whereas predicted positions are depicted as unfilled circles. Note that although the path is depicted as comprising discrete positions, the prediction component 112 may determine the path as a line or curve and/or as a variation from or parameter of a canonical reference line or curve associated with a maneuver. For example, the path may define a curvature parameter of a turn maneuver or a variance from a curve defined by the maneuver.

In some examples, the prediction data may be additionally or alternatively based at least in part on map data or other data. In some examples, the prediction data may comprise a top-down segmentation of the environment, as described in more detail in U.S. patent application Ser. No. 15/963,833, which is incorporated in its entirety herein, and/or a top-down prediction associated with the environment, as described in more detail in U.S. patent application Ser. No. 16/779,576, which is incorporated in its entirety herein. For example, in the depicted example, the predicted positions of the pedestrian map be based at least in part on the position of the pedestrian 120 relative to a crosswalk in the environment. The map data map be stored by memory 108. In some examples, the prediction data and/or other perception data may be stored as part of log data. The log data may comprise sensor data and/or perception data associated with the future times, $t_1$ and $t_2$, collected and generated by the vehicle 102, respectively, as the vehicle 102 continues to operate. Note that at the next time step, the vehicle 102 will generate new predictions. In other words, a predicted maneuver and position may have been generated by the perception component 112 at time $t_{-2}$ and the current time may have corresponded to what was time $t_2$.

In some examples, a scenario label 134 may be associated with sensor data and/or perception data stored as part of the log data. In some examples, the scenario label 134 may be added by a different computing device (e.g., a remote computing device after the log data is transmitted by the vehicle 102). For example, the scenario label may characterize a number, type, or configuration of objects in the environment and/or a layout of the environment. In some examples, the scenario label may be a data structure. The configuration may define a position, heading, and/or velocity of an object in the environment and the layout of the environment may identify a general characterization of the environment (e.g., four-way light controlled intersection, four-way light-controlled intersection with uncontrolled left turn lane, three-way uncontrolled intersection with one-way road). In some examples, a scenario label may be generated as part of a log data processing operation. The processing operation may comprise determining sensor data associated with perception data that identifies a relative location and/or type of object. For example, the processing operation may identify a number and/or type of objects in the regions enumerated below and associating this data with the respective sensor data. The resulting metadata annotations may be clustered and a scenario label may be associated with each disparate cluster, which may be based on number and/or type of object and/or region. The regions may include, for example:

in front of the vehicle 102,
to a side of the vehicle 102,
behind the vehicle 102,
in a lane over from a lane of the vehicle 102,
in a next further lane from the vehicle 102,
in or near a variety of intersection/junction configurations (e.g., at a four-way controlled intersection; in a T-junction; at a 4-way, 2 controlled, 2 uncontrolled intersection),
next to a roadway, etc.

In some examples, the scenario label may not be humanly comprehensible—the scenario label may merely be a cluster identifier—although in other examples, humanly comprehensible terms may be attached to the clusters (e.g., two objects to side of vehicle, one object in front of vehicle), trained embeddings, and the like.

The vehicle 102 may transmit at least part of the sensor data, perception data, and/or scenario label 134 (if one is generated On-vehicle by the perception component 112) as part of the log data to a remote computing device (unillustrated in FIG. 1).

Example System

Figure 2:
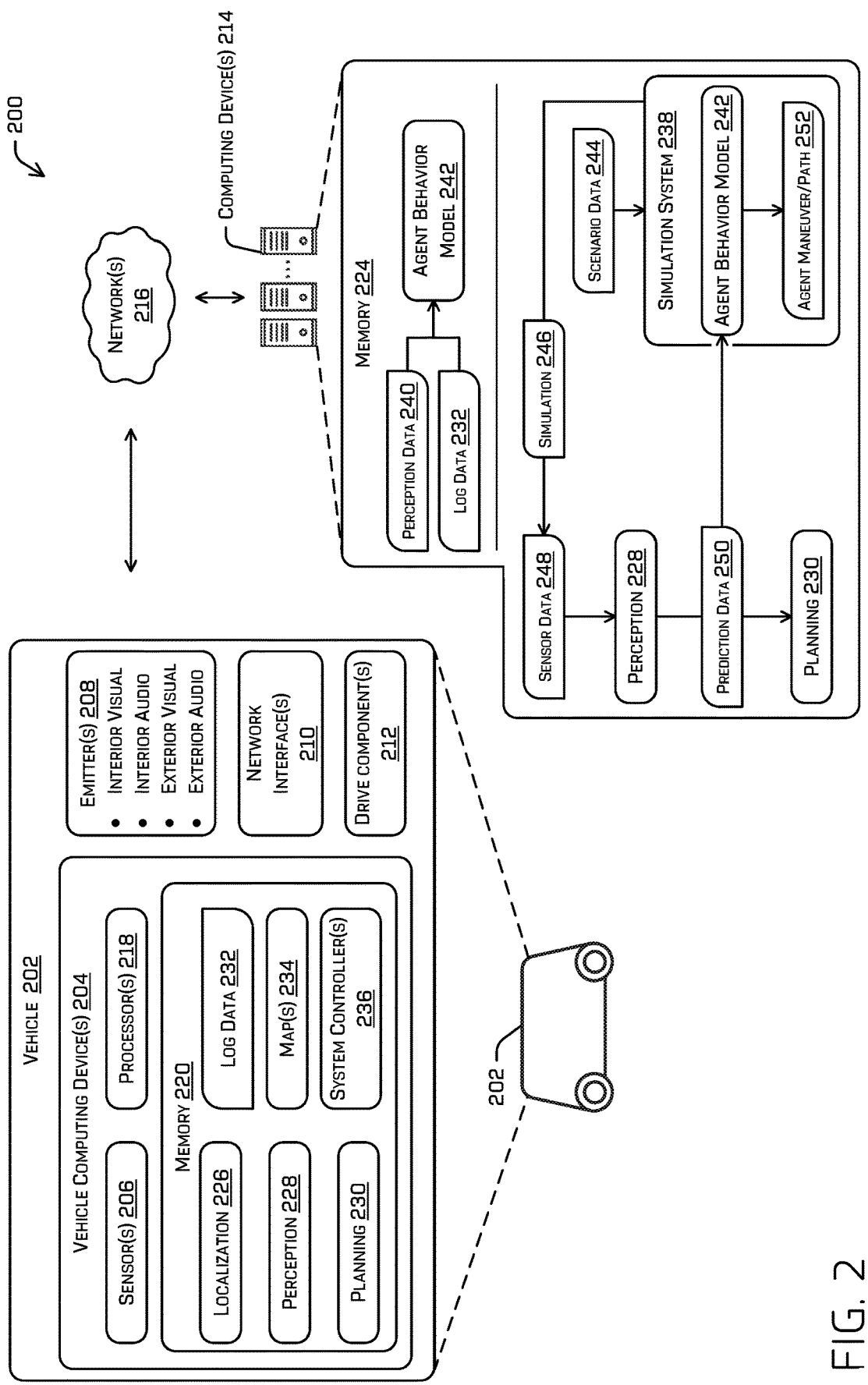
FIG. 2 illustrates a block diagram of an example architecture for generating an agent behavior model for use in a simulation system.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. In some examples, the simulated sensors discussed herein may correspond to a specific type of sensor and/or any of the sensors. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, log data 232, map(s) 234, and/or system controller(s) 236—zero or more portions of any of which may be hardware, such as GPU(s), CPU(s), and/or other processing units. Localization component 226 may represent localization component 110, perception component 228 may represent perception component 112, planning component 230 may represent planning component 114, and simulation system 238 may represent simulation system 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle. The planning component 230 may be part of the simulation system 238 in some examples.

The log data 232 may comprise sensor data, perception data, and/or scenario labels collected/determined by the vehicle 202 (e.g., by the perception component 228), as well as any other message generated and or sent by the vehicle 202 during operation including, but not limited to, control messages, error messages, etc. In some examples, the vehicle 202 may transmit the log data 232 to the computing device(s) 214. The computing device(s) 214 may identify one or more scenarios based at least in part on the log data, which may also comprise defining a scenario. For example, the computing device(s) 214 may determine an environmental layout, a number, type, and a configuration of object(s) in the environment and/or associate this definition with one or more portions of log data associated with that scenario. In some examples, the log data 232 may comprise (historical) perception data 240 that was generated on the vehicle 102 during operation of the vehicle. In an additional or alternate example, the perception data 240 may include perception data generated during a simulation.

In some examples, the computing device(s) 214 may determine the agent behavior model 242 based at least in part on the log data 232 and the perception data 240 according to the techniques discussed herein.

The simulation system 238 may operate on the vehicle 202 and/or on the computing device(s) 214 (although FIG. 2 depicts the simulation system 238 as operating on the computing device(s) 214. If the simulation system 238 is operating on the vehicle, the simulation system 238 may provide alternate prediction(s) about the maneuver and/or path that an object may take. These alternate prediction(s) may be provided as input to the planning component 230. The simulation system 238 may run parallel to the perception component 228 and/or the perception component 228 may be part of the simulation system 238 and/or provide perception data to the simulation system 238.

The simulation system 238 may determine a simulation of the environment and/or the vehicle 202. For example, the simulation may comprise a representation of a position, orientation, movement, and/or quality of portions of the environment and/or the vehicle 202. The environment may comprise an agent, such as another vehicle, a pedestrian, vegetation, a building, signage, and/or the like. Simulation may be used to test operation of various components of the vehicle 202. In some examples, simulation may be used to test the perception component 228 and/or the planning component 230 of the autonomous vehicle based at least in part on providing data from the simulation to the perception component 228 and/or the planning component 230.

The simulation system 238 may receive scenario data 244 and/or log data 232. The simulation system 332 may receive scenario data 244 and/or log data 232 to determine the simulation 246, which may be a two or three-dimensional representation of the scenario. For example, the three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out. In some examples, the scenario data 244 may be procedurally generated as part of a combinatorial iteration through scenarios, received responsive to interaction with a user interface of the computing device(s) 214 (e.g., responsive to user input), and/or the like, although in at least one example, the scenario data 244 may be at least partially defined by a scenario associated with the log data (and/or the agent behavior model 242). In some examples, the scenario data 244 may modify characteristics of a scenario that is generated based on log data 232.

The scenario data 244 may comprise a two-dimensional representation of an environment associated with a scenario, objects contained therein, and characteristics associated therewith, all of which may be part of a scenario associated with the log data. For example, the scenario data 244 may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle," "traffic light," "traffic signage," "building," "roadway," "crosswalk, "sidewalk"), and/or other kinematic qualities associated with the object and/or the object type (e.g., a friction coefficient, an elasticity, a malleability). As regards the environment itself, the scenario data may identify a topology of the environment, weather conditions associated with the environment, a lighting state (e.g., sunny, cloudy, night), a location of light sources, and/or the like. In some examples, topology, fixed object (e.g., buildings, trees, signage) locations and dimensions, and/or the like associated with the scenario data 244 may be generated based at least in part on map(s) 234. In some examples, the scenario data 244 may be used to instantiate a three-dimensional representation of the object and/or the simulated environment may be instantiated based at least in part on map data (e.g., which may define a topology of the environment; the location and/or dimensions of fixtures such as signage, plants, and/or buildings) and/or the scenario data. In some examples, an agent behavior model 242 may be associated with a scenario or vice versa.

In some examples, a simulated sensor may determine sensor data 248 based at least in part on the simulation 246. For example, U.S. patent application Ser. No. 16/581,632, filed Sep. 24, 2019 and incorporated herein, discusses this in more detail. In an additional or alternate example, the simulation 246 may itself comprise simulated sensor data.

The perception component 228 (e.g., a copy thereof, which may comprise software and/or hardware, which may include hardware-in-the loop simulation) may receive the simulated sensor data 248 generated based on the simulation 246 and may output prediction data 250, which may comprise a predicted maneuver and/or a predicted path of a simulated object. The perception component 228 may provide the prediction data 250 to the planning component 230 and/or to the agent behavior model 242, which may be part of the simulation system 238 or called by the simulation system 238 when an object of a type associated with the agent behavior model 242 is instantiated based at least in part on the scenario data 244.

The agent behavior model 242 may modify the prediction data 250 according to the techniques discussed herein to generate an agent maneuver and/or path 252. The agent maneuver and/or path 252 may be used to control motion of a simulated object in the simulation 246. In other words, the agent maneuver and/or path 252 may be part of the simulation 246—the simulation system 238 may comprise an agent control component for controlling motion of the simulated dynamic objects and the agent control component may receive the agent maneuver and/or path 252 from the agent behavior model 242. The agent maneuver and/or path 252 may be used to test the perception component 228 and/or planning component 230.

Testing and/or training the planning component 230 may be based at least in part on the agent maneuver/path 252. For example, the simulation system 238 may provide a safe and expeditious way of testing how the planning component 230 reacts to various scenarios that the vehicle 202 may or may not have encountered during operation, and determining whether or not the planning component 230 generates safe and/or efficacious control instructions to navigate the scenarios.

In some examples, the simulation system 238 may additionally or alternatively store a ruleset and may determine whether the planning component 230 passed or failed a scenario based at least in part on the ruleset. The ruleset may be associated with the scenario data 244. In some examples, the simulation system 238 may record a version of the planning component 230 in association with a scenario identifier and/or an indication of whether the planning component 230 passed or failed. In an additional or alternate example, the simulation system 238 may determine a non-binary indication associated with performance of the planning component 230 (e.g., a score in addition to or instead of a pass/fail indication). The non-binary indication may be based at least in part on a set of weights associated with the ruleset. In at least one example, the ruleset may specify a maximum number of collisions per n iterations of a scenario, where n is a positive integer. In some examples, the ruleset may be part of or replaced by an event detection system (U.S. patent application Ser. No. 16/682,971, filed Nov. 13, 2019, the entirety of which is incorporated herein) and/or a collision monitoring system (U.S. patent application Ser. No. 16/703,625, filed Dec. 4, 2019).

The memory 220 and/or 224 may additionally or alternatively store a mapping system, a planning system, a ride management system, etc. Although perception component 228 and/or planning component 230 are illustrated as being stored in memory 220 and/or 224, perception component 228 and/or planning component 230 may include processor-executable instructions, machine-learned model(s) (e.g., a neural network), and/or hardware.

As described herein, the localization component 226, the perception component 228, the planning component 230, the agent behavior model 242, the simulation system 238, and/or other components of the system 200 may comprise one or more ML models. For example, the localization component 226, the perception component 228, the planning component 230, and/or the simulation system 238 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963, 833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228 and/or simulated perception data and transmit the instructions to the system controller(s) 236, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process

Figure 3:
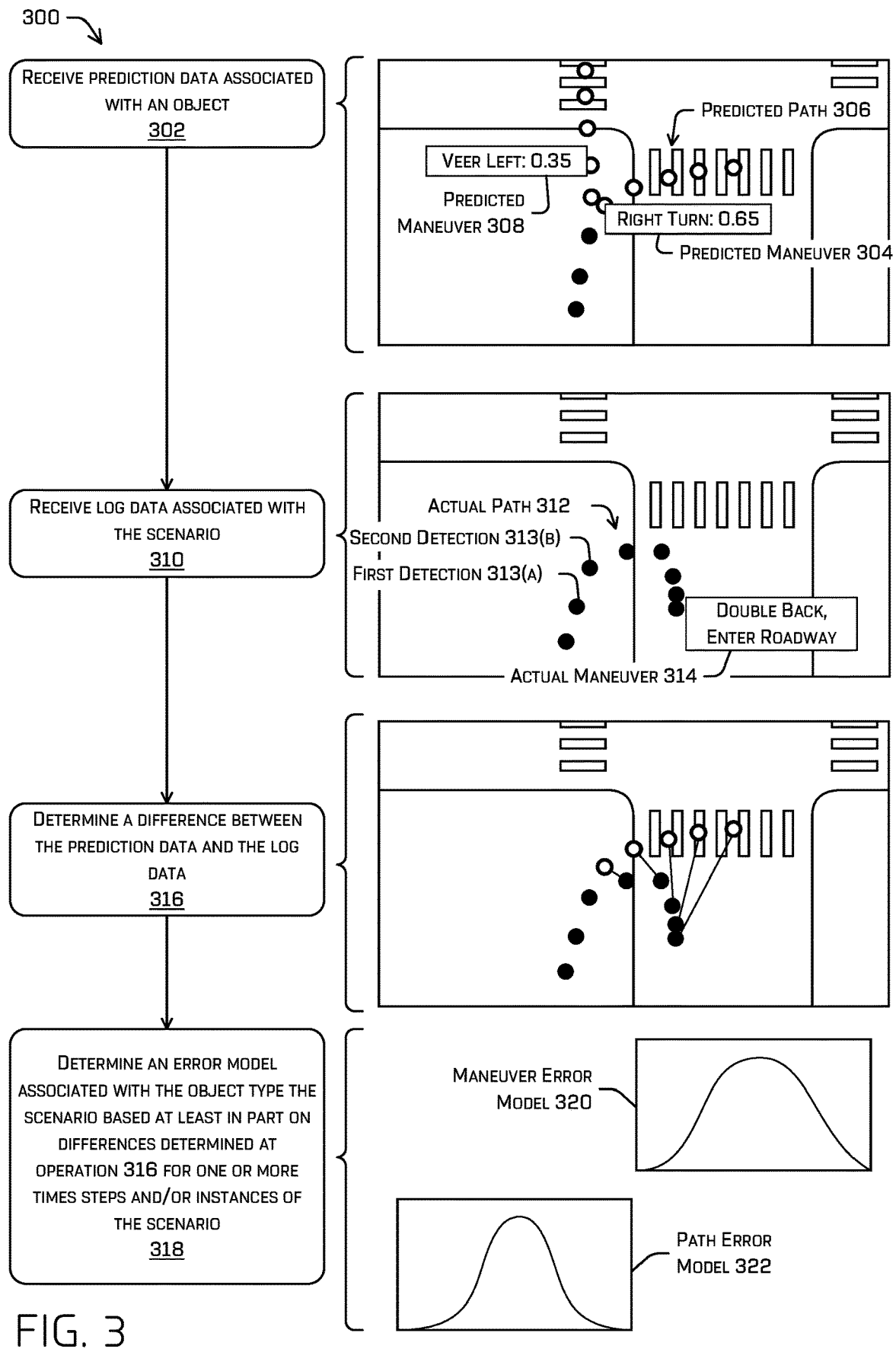
FIG. 3 illustrates a pictorial flow diagram of an example process for generating an error model that may be part of an agent behavior model for realistic simulation of dynamic objects.

FIG. 3 illustrates a pictorial flow diagram of an example process 300 for generating one or more error models that may be part of an agent behavior model for realistic simulation of dynamic objects. In some examples, the techniques may comprise determining an agent behavior model per object type and/or per scenario. For example, the techniques may comprise determining a first agent behavior model for the object type "vehicle," a second agent behavior model for the object type "pedestrian," etc. In an additional or alternate example, the vehicle behavior model may comprise one or more first error models associated with a first scenario, one or more second error models associated with a second scenario, etc. In some examples, example process 300 may be conducted by computing device(s) 214 and/or a component of the vehicle 202. Note that the operations described below discuss the prediction data associated calculated at a single time step. The operations may be repeated for perception data determined at additional time steps.

At operation 302, example process 300 may comprise receiving prediction data associated with an object, according to any of the techniques discussed herein. For example, the prediction component of an autonomous vehicle may receive sensor data from sensors associated with the autonomous vehicle and determine the prediction data by the perception pipeline. The prediction data may comprise a first predicted maneuver 304 and/or a first predicted path 306 of an object in the environment and/or a second predicted maneuver 308 and/or a second predicted path (unlabeled due to space constraints). For example, FIG. 3 continues to illustrate an example representation of prediction data generated by a perception component in association with sensor data collected in the example scenario 100. Note that the perception component may predict a maneuver per time step (e.g., straight at $t_1$, turn right at $t_2$ through $t_6$, straight at $t_7$ through $t_{10}$). Also, note that the maneuvers and paths may be predicted at a same or different time interval. For example, the path may be predicted at a finer (shorter) time interval than the maneuver (e.g., path predicted for every 0.2 seconds, whereas maneuver may be predicted for ever 1 second, although any other time interval is contemplated). In some examples, the perception component may determine a probability in association with a predicted maneuver. Although the manner in which the probability is indicated may vary (e.g., a number between 0 and 1, a percentage, a logit), in the depicted example, predicted maneuver 304 is associated with a 0.65 probability and predicted maneuver 308 is associated with a 0.35 probability. In some examples, the probabilities associated with the predicted maneuvers associated with an object may sum to 1, as in the depicted example.

In some examples, the perception component may additionally or alternatively determine scenario data as the vehicle operates. For example, the perception component may generate a scenario data structure comprising at least part of the perception data. The data structure may indicate a layout of the environment and/or a number, type, or configuration of the objects in the environment. The prediction data and/or the scenario data structure may be associated and/or added to the log data.

Note that FIG. 3 depicts the predicted path 306 as discrete positions in the environment, although it is understood that the predicted path 306 may additionally or alternatively be a line or curve. For example, the perception component may be trained to output a motion primitive associated with the predicted maneuver 304 (see U.S. patent application Ser. No. 16/517,506, filed Jul. 19, 2019, the entirety of which is incorporated herein by reference), such as a general rightward curve and the predicted path 306 may comprise one or more parameters associated with the motion primitive that modifies the length, curvature, termination, etc. of the motion primitive. Regardless, the path may itself define discrete positions, a line, a curve, a parameter associated with a curve/line, and/or a variation from a canonical curve/line (e.g., a distance or variance in distance from the curve/line that the object may be at any particular position along the curve/line).

At operation 310, example process 300 may comprise receiving log data associated with the scenario, according to any of the techniques discussed herein. In some examples, the log data may include an indication of the actual path 312 and/or an actual maneuver 314 taken by the object, either of which may include a first detection 313(a) of the object associated with a first time and a second detection 313(b) of the object associated with a second time. In the depicted instance, the pedestrian doubled back and entered the roadway, which is reflected in both the depicted actual path 312 and the actual maneuver 314. In some examples, the actual maneuver 314 may be determined from the log data. For example, a perception component running on or off the vehicle may determine a maneuver that was carried out by the object based on sensor data captured by the vehicle and that actual maneuver may be associated with the sensor data as log data. In an additional or alternate example, the actual maneuver may be labeled based on input received at a computing device (e.g., from a human, from a machine-learned model).

At operation 316, example process 300 may comprise determining a difference between the prediction data and the log data, according to any of the techniques discussed herein. For the predicted maneuver, this may comprise determining whether the predicted maneuver and the actual maneuver are different for a same time step and generating an indication of whether the maneuver was the same or different. A record may be kept (in association with a same or similar scenario, as identified by a cluster into which the sensor data is grouped as discussed above) of the number of times the actual maneuver differed from or was the same as the predicted maneuver. The accuracy of the prediction may be indicated as a percentage, in some examples, although other methods are contemplated. For maneuvers that were different, the indication may additionally or alternatively indicate the actual maneuver. For the path data, operation 316 may comprise determining a Euclidean (or any other coordinate space) distance between points in the precited path and actual path associated with a same time step, whether those points are discrete positions or positions along a line or curve. In some examples, the path difference may additionally or alternatively comprise a difference in orientation and/or velocity, as the predicted and/or actual path may additionally or alternatively comprise such data. FIG. 3 depicts as lines the Euclidean distances between the predicted positions and the actual positions corresponding to the same time step.

At operation 318, example process 300 may comprise determining an error model associated with the object type based at least in part on differences determined at operation 314, according to any of the techniques discussed herein. Operation 318 may comprise determining a probability distribution in association with the object type and/or scenario based at least in part on differences calculated over multiple time steps in a same scenario, one or more time steps of multiple instances of a same scenario, a same position in an environment of multiple instances of a same scenario, and/or the like. For example, the error model may indicate a percentage of the time that a predicted trajectory associated with an object of a certain object classification was correct and/or when turned left, turned right, went straight, etc. when a particular trajectory was predicted. To further illustrate, a particular error model may be associated with the object classification pedestrian and a particular predicted trajectory, such as maintaining a trajectory of the pedestrian, turning left, etc. and the observed probability of the predicted trajectory being correct. The error model(s) may additionally or alternatively be computed per position and/or time step. In other words, the error models may vary per position or time step in the scenario. In some examples, the error model(s) may be additionally or alternatively associated with the autonomous vehicle's state. In other words, the error model may be determined per vehicle state, predicted trajectory, and/or object classification associated with the object for which the trajectory is predicted.

In some examples, operation 318 may comprise determining an error model in association with the predicted maneuver (i.e., maneuver error model 320), indicating a probability that an object of a particular object type in a particular scenario will adhere to the predicted maneuver. The error model may additionally or alternatively indicate probabilities associated with different maneuvers. For example, the maneuver error model 320 may comprise a first probability and/or probability distribution that a vehicle will engage in a first maneuver, a second probability and/or probability distribution that the vehicle will engage in a second maneuver, etc. In an additional or alternate example, the error model may indicate a probability associated with a maneuver transition (e.g., transitioning from executing a left turn to stopping, left turn to right turn, left turn to straight).

In some examples, operation 318 may comprise determining an error model in association with the predicted path (i.e., path error model 322), indicating a probability that an object of a particular object type in a particular scenario will adhere to the predicted path. The path error model 322 may indicate a probability that an object of an object type will veer from the path by a distance. The path error model 322 may comprise multiple such probabilities and distances. For example, the path error model 322 may indicate a first probability that a pedestrian will be positioned at a first distance from a predicted position, a second probability that a pedestrian will be positioned at a first distance from a predicted position, etc.

Determining an error model may additionally or alternatively comprise clustering error models based at least in part on scenario data associated therewith to determine error models associated with similar scenarios. Error models associated with a same cluster may be associated and/or amalgamated into an error model representing the cluster.

In some examples, example process 300 may be accomplished as a precomputed step over multiple logs received from one or more autonomous vehicles—or at least log data associated with one or more instances of a scenario—before example process 600, although in an additional or alternate example, example process 300 may occur as part of the simulation (e.g., where the vehicle plays back log data of the same vehicle or a different vehicle).

Example Predicted Maneuver, Example Predicted Path, Example Scenarios, and Example Scenarios FIG. 4A illustrates an example predicted maneuver 400, a predicted path 402, and an example actual path 402 taken by the object that was the subject of the prediction. In the depicted example, the predicted path 402 is a continuous curve instead of discrete positions, although discrete positions may be defined by the curve at different time steps. In some examples, the general shape (i.e., canonical curve/line) of the predicted path 402 may be based at least in part on the predicted maneuver 400 and the predicted path 402 may comprise one or more parameters modifying that general shape (e.g., increasing/decreasing the curve's length, which may also change the velocity/acceleration since the path is defined over time; curvature; etc). FIG. 4A also depicts log data as black-shaded circles, indicating the actual positions the object was located in at different time steps. In the depicted example, the predicted maneuver was correct—the object, a vehicle in this case, executed a right turn. Again, note that only one predicted maneuver is depicted, but the perception component may determine a predicted maneuver in association with each time step. In the depicted example we may assume the predicted maneuver for the entire prediction horizon depicted in FIG. 4A is "right turn."

However, there is variation in the object's actual path from the predicted path 402. This is illustrated, in part, by the distance (i.e., path variation 404) between actual position 406 and a portion of the predicted path 402 associated with a same time step as actual position 406. An error model generated for vehicle maneuvers in this scenario may be based at least in part on the correct maneuver prediction and an error model generated for the vehicle path in this scenario may be based at least in part on the path variation 404.

FIGS. 4B & 4C illustrate different example scenarios, log data representations 408 and 410 (e.g., top-down representation of sensor data included in the log data collected by vehicle 202 during operation), and simplified scenario data structures 412 and 414 associated therewith, respectively. For example, FIG. 4B illustrates a log data representation 408 of a scenario in which the vehicle 202 encountered a four-way junction with two vehicles in the junction and a singular pedestrian on a sidewalk at the position indicated in the log data representation 408. In some examples, the perception component may determine a scenario data structure 412 that indicates a simplified form of the log data representation 408—an overly simplified version of this is indicated by the scenario data structure 412, which is depicted as the label "2 Vehicles in 4-Way Junction, 1 Pedestrian." For example, the scenario data structure 412 may comprise an indication of the environment layout (e.g., roadway directions of travel; existence and location of specialty lane; existence and location of signage/junction control; existence, number, and location of lanes/junctions); the existence, location, and/or static object(s) in the environment; and the number, classification, position, orientation, and/or velocity of dynamic object(s) in the environment. In some examples, the error models may be clustered based at least in part on the respective scenario data structures associated therewith. For example, multi-dimensional scaling (MDS), principal component analysis (PCA), and/or the like may be applied to the scenario data and the error models associated with a same cluster, according to the clustering algorithm, may be amalgamated and/or a representative error model may be chosen from among the error models associated with the same cluster. Practically, this may result in amalgamating and/or determining a representative error model from among error models associated with scenario data indicating pedestrians on either side of the vehicle, scenarios where multiple vehicles are in an intersection, etc. For example, the error models generated in association with FIGS. 4B and 4C may be amalgamated according to some clustering techniques.

FIG. 4C similarly depicts log data representation 410 and the associated (simplified) scenario data structure 414 that may be generated by the perception component of the vehicle 202.

Note that, in at least one example, at least two sets of error models may be generated in association with the scenarios depicted in FIG. 4B and FIG. 4C, although more or less error models may be determined. For example, the scenarios comprise two different object types, so a maneuver error model/path error model pair may be generated for the object type "vehicle" and another pair for the object type "pedestrian." More or less error models may be created in association with a single object type (e.g., where the maneuver and path error models are fused, where other error models are added for other prediction data, such as object deformation for articulating objects). In an additional or alternate example, at least four sets of error models may be generated—one set of error modes per vehicle type and per scenario, resulting in four sets between the two types of objects present in the two scenarios.

Figure 5A:
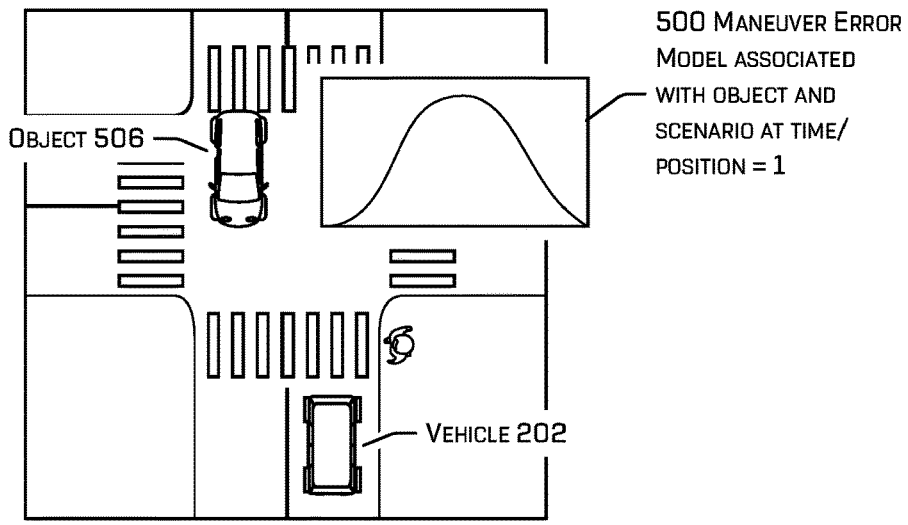
FIGS. 5A-5C illustrate the manner in which an error model associated with an object and/or scenario may change based at least in part on the position of the object in the environment/the actions taken by the object.
Figure 5B:
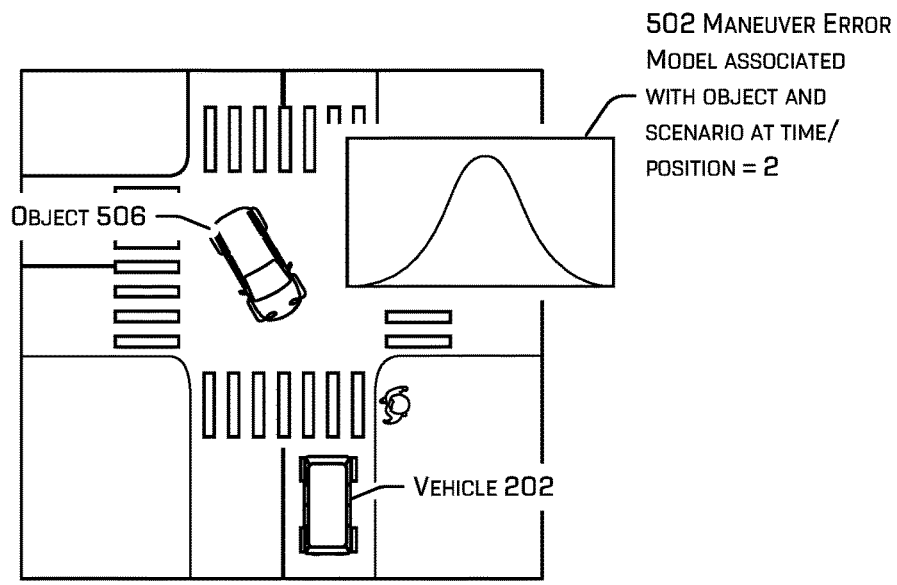
Figure 5C:
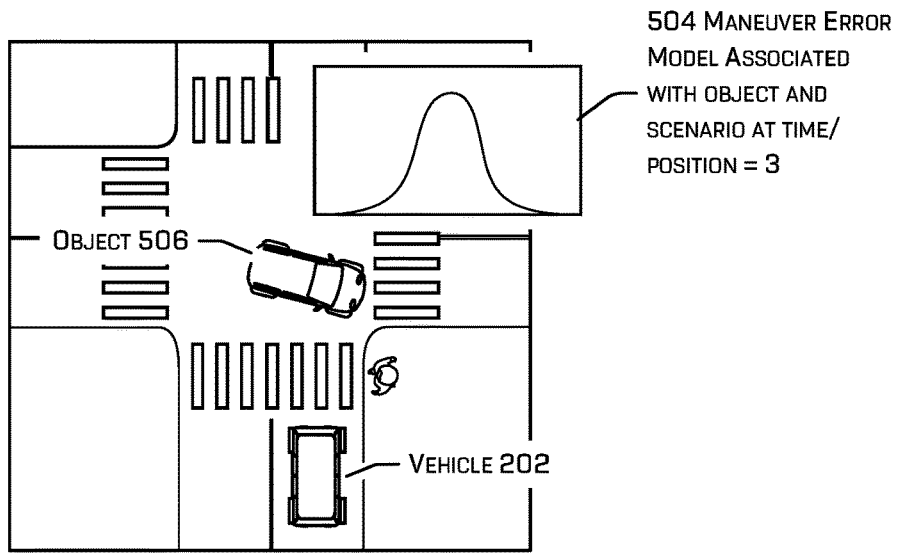

In an additional or alternate example, there may be a set of error models per object type, scenario, and/or position in the environment or time step in the scenario. For example, FIGS. 5A-5C illustrate the way an error model associated with an object and/or scenario may change based at least in part on the position of the object in the environment/the actions taken by the object. FIGS. 5A-5C illustrate a maneuver error model that may be part of an agent behavior model associated with the object type "vehicle" and the depicted scenario. Note that the breadth in the error model 500 in FIG. 5A associated with the first time/position (which may be a future time/position) is broader than the probability distributions indicated by the error models 502 and 504 at the subsequent times. This breadth may indicate that at the position, heading, orientation, and/or maneuver of the object 506 at the first time/position, the object 506 may be more likely to execute a maneuver that the prediction component is unlikely to anticipate. For example, such a maneuver could be an aberrant behavior of some kind like swerving in front of vehicle 202.

However, in FIG. 5B, after the object 506 starts to execute a turn in front of vehicle 202, the maneuver error model associated therewith includes a narrower probability distribution since it may be more likely that the object 506 will complete the turn, which updated prediction data may predict. This narrowing trend increases with the error model 504 in FIG. 5C.

Note that, although FIGS. 3 and 5A-5C depict an error model as a two-dimensional probability distribution, the error model may include a three or more dimensioned probability distribution.

Example Simulation Process

Figure 6:
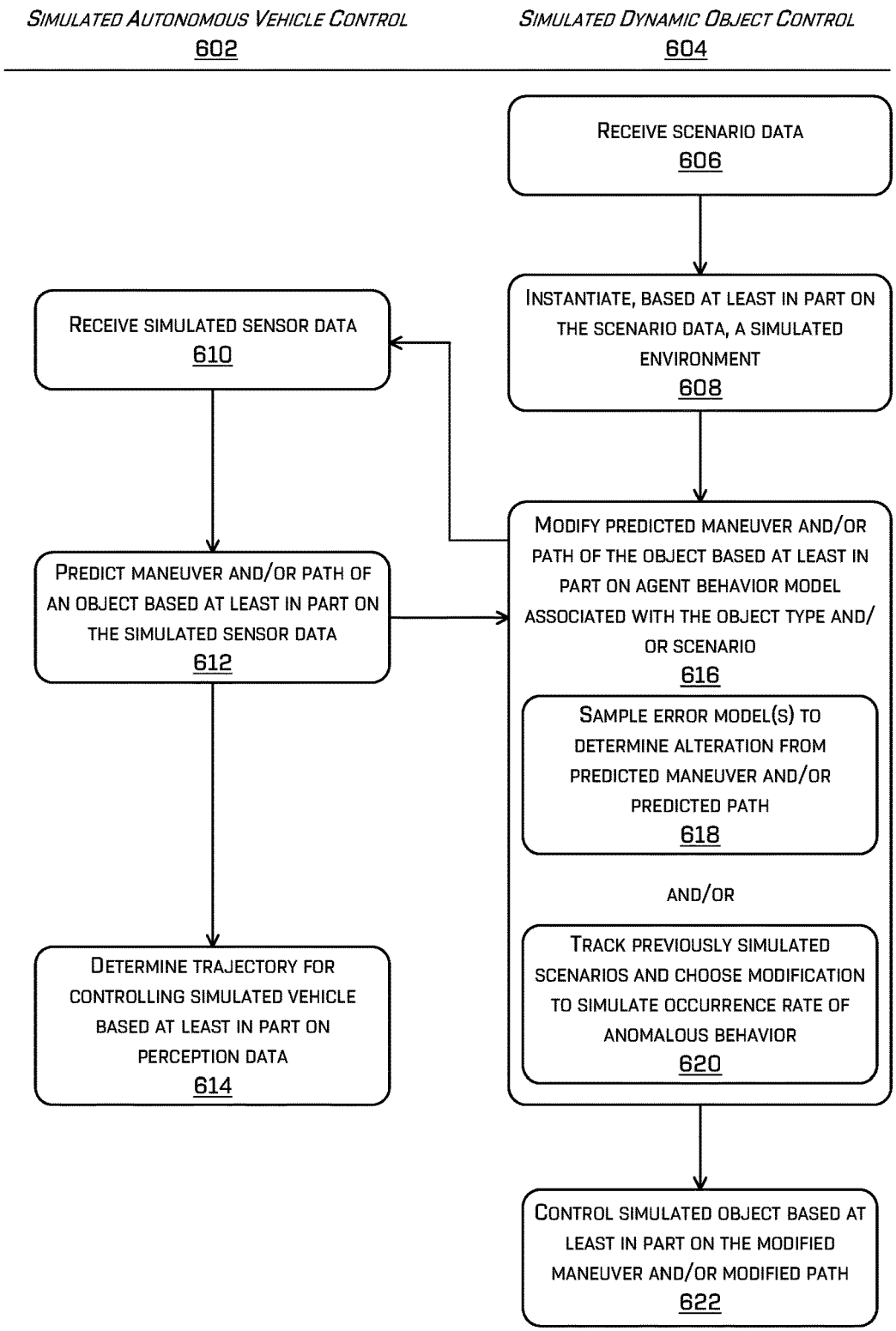
FIG. 6 illustrates a flow diagram of an example process for realistically simulating motion of a dynamic object in a simulated environment, including anomalous behaviors. Some of the techniques may comprise running multiple simulations of a scenario and causing the dynamic object to take an anomalous action at an occurrence rate dictated by an error model.

FIG. 6 illustrates a flow diagram of an example process 600 for realistically simulating motion of a dynamic object, including anomalous behaviors, in a simulated environment. Example process 600 may comprise two subprocesses: controlling a simulated autonomous vehicle, example subprocess 602; and controlling a simulated dynamic object, example subprocess 604. In some examples, a perception component and/or planning component of an autonomous vehicle—or copies thereof, which may include using hardware-in-the-loop simulation—may accomplish example subprocess 602, whereas a simulation system and/or agent behavior model may accomplish example subprocess 604. Note that operations that may be accomplished as part of subprocess 602 are depicted on the left-hand side of FIG. 6, whereas operations that may be accomplished as part of subprocess 604 are depicted on the right-hand side of FIG. 6. Note that the vertical spacing of the blocks does not implicate relative timing of the operations. In an additional or alternate example, the simulation system and/or agent behavior model may accomplish all or part of example subprocesses 602 and 604. In an additional or alternate example, example process 600 does not include subprocesses, at least as divided according to the figure. In some instances, the vehicle computing device(s) 204 and/or the computing device(s) 214 may each or individually accomplish all or part of example process 600.

In some examples, example process 600 may be executed by a simulation system during real-time operation of an autonomous vehicle, where the simulated vehicle and environment discussed below corresponds to the real-world autonomous vehicle and a real-world environment surrounding the autonomous vehicle. In other words, the example process 600 may be executed for a real-world, real-time scenario. In such an example, the simulation system may output an alternate prediction (e.g., an alternate predicted maneuver/path). In an additional or alternate example, example process 600 may be executed by the simulation system in a fully or partially synthetic scenario, where the scenario is fully generated based at least in part on scenario instructions or partially using sensor data, respectively. The synthetic scenario may be executed in real or synthetic time. For example, a partially synthetic scenario may generate the scenario data based at least in part on real-time sensor data or based on log data.

Some of the techniques may comprise running multiple simulations of a scenario and causing the dynamic object to take an anomalous action at an occurrence rate dictated by an agent behavior model. In an additional or alternate example, the dynamic object may take an anomalous action based at least in part on sampling a probability distribution of the agent behavior model.

At operation 606, example process 600 (and/or example subprocess 604) may comprise receiving scenario data, according to any of the techniques discussed herein. For example, a simple simulation component may generate the scenario data. In an addition or alternate data, the scenario data may comprise sensor data, scenario instructions, and/or a scenario data structure. In some examples, the scenario data structure may comprise a position, orientation, and/or characteristics of static object(s), dynamic object(s), and/or the simulated vehicle in the environment, which may correspond to real-time operation of an autonomous vehicle and/or may correspond to simulated operation of the autonomous vehicle. In some examples, a planning component of the autonomous vehicle may generate instructions for controlling the simulated vehicle in an agnostic manner to the simulation (e.g., the instructions generated by the planning component may be the same as those generated for a similar real-world situation). The operation of the planning component may be tested in this manner. In some examples, a component may translate instructions generated by the planning component to instructions for controlling the simulated vehicle in the simulated environment (e.g., updating a simulated state associated with the simulated vehicle, which may comprise a position, orientation, velocity, acceleration, heading, and/or the like associated with the simulated vehicle).

The scenario data may additionally or alternatively comprise an indication of an object type associated with one or more objects and/or characteristics associated with the one or more objects (e.g., a position, velocity, acceleration, heading, material type, kinematic coefficient). Any of the data discussed herein may be part of the scenario data structure associated with a portion of log data. The scenario data structure may comprise a two-dimensional image, a publish-subscribe message, and/or the like.

At operation 608, example process 600 (and/or subprocess 604) may comprise instantiating, based at least in part on the scenario data, a simulated environment, according to any of the techniques discussed herein. Operation 608 may comprise procedurally generating the simulated environment based at least in part on a set of template models associated with the object types. For example, the set of template models may comprise three different passenger vehicle models, four different pedestrian models, and/or the like. Any number of different models may exist. In some examples, a template model may comprise a three-dimensional model of a surface of an object without any texturing, although in additional or alternate examples, the model may comprise texture.

The template model may comprise a polygon mesh, a triangle mesh, and/or the like. In some examples, models associated with dynamic objects may have a higher polygon count than models associated with static objects. In some examples, the simulated environment may comprise surface models and lack lighting and/or textures. In additional or alternate examples, the simulated environment may comprise lighting and/or textures, but the techniques described herein work without lighting and/or textures. The simulated environment may comprise a model of the simulated vehicle. In some examples, instantiating the environment portion of the simulated environment may be based at least in part on log data, scenario data, and/or map data and objects in the environment may be based at least in part on instructions received as part of the scenario data (e.g., instructions generated based at least in part on user selection(s) and/or interaction with a user interface, procedurally-generated instructions).

At operation 610, example process 600 (and/or subprocess 602) may comprise receiving simulated sensor data, according to any of the techniques discussed herein. For example, the perception component may receive simulated sensor data based at least in part on the simulation generated by the simulation system (e.g., based at least in part on operation(s) 616, 618, and/or 620).

At operation 612, example process 600 (and/or subprocess 602) may comprise predicting a maneuver and/or path of an object based at least in part on the simulated sensor data, according to any of the techniques discussed herein. For example, the perception component may determine a predicted maneuver and/or a predicted path of the (simulated) object based at least in part on the simulated sensor data.

At operation 614, example process 600 (and/or subprocess 602) may comprise determining a trajectory for controlling the simulated (autonomous) vehicle based at least in part on perception data, according to any of the techniques discussed herein. For example, the perception data may be generated by the perception component at operation 612 and the perception data may comprise the prediction data determined at operation 612.

At operation 616, example process 600 (and/or subprocess 604) may comprise modifying the predicted maneuver and/or path of the object based at least in part on the agent behavior model associated with the object type and/or scenario, according to any of the techniques discussed herein. Operation 616 may comprise operation 618 and/or operation 620. In some examples, operation 616 may comprise retrieving an agent behavior model associated with the object type and/or scenario and using the agent behavior model to modify the predicted data. In examples where the agent behavior model comprises multiple dimensions of data (e.g., different multi-dimensional error models associated with different scenarios, positions, maneuvers), operation 616 may comprise selecting error model(s) of the agent behavior model that correspond to the scenario and/or predicted maneuver/path.

At operation 618, example process 600 (and/or subprocess 604) may comprise sampling error model(s) to determine an alteration from a predicted maneuver and/or predicted path, according to any of the techniques discussed herein. Operation 618 may comprise randomly sampling the error model(s) that are part of the agent behavior model associated with the object type and/or scenario (and/or position/time in the environment/scenario). The sampled portion of the probability distribution may indicate a variation from the predicted maneuver/position. Sampling the error model may comprise conducting a weighted sampling of the potential maneuvers associated with a state of the object based at least in part on the predicted maneuver and the error model (e.g., based on predicting that the object will continue straight an error model associated with such a prediction and the object and/or autonomous vehicle state may indicate a 55% probability of continuing straight, 18% probability of turning right, 15% probability of stopping, 12% probability of turning left; a random selection may be made based at least in part on these probabilities).

For example and depending on the shape of the probability distribution, a sample that results in a maneuver with a low probability may be associated with a sharp departure from the predicted maneuver/position—and likely from normative behavior too. Different samples associated with a maneuver error model may result in maintaining the predicted maneuver, but other probabilities in or close to tails of the distribution may result in changing the maneuver to a different maneuver (e.g., going from driving straight ahead to slamming to a stop, swerving in a direction). Similarly, a sampling of a path error model that results in a high probability may result in not modifying the predicted path or only slightly laterally varying the position of the simulated object. Whereas tail or near-tail behavior may include wide lateral departures from the predicted path.

In an additional or alternate example, operation 618 may comprise determining multiple predicted maneuvers based at least in part on the error model and selecting (by a set of weighted probabilities associated with the multiple predicted maneuvers that are based at least in part on the error model) one of the multiple predicted maneuvers from among the multiple predicted maneuvers. For example, the perception component may predict that a dynamic object may execute a right turn and may predict a curve that the object will follow. The agent behavior model may sample a maneuver error model and receive a normative probability and therefore maintain the maneuver as a right turn, but sampling the path error model may result in a probability associated with an aberrant behavior. Determining the modified maneuver/path for controlling the simulated object may comprise determining instructions that cause the simulated object to still execute a right turn, but the turn may be very tight or very loose, causing the simulated object to exit a lane, enter a special lane, enter a sidewalk, cross a center line, and/or the like. This example may be inverted if the results of sampling were inverted. The maneuver could be changed drastically—a vehicle that was executing a turn could suddenly turn the opposite direction, but the vehicle may not vary from that altered maneuver widely if the path probability is normative. In some examples, operation 618 may comprise modifying the maneuver and/or path if a sampled probability meets or exceeds a threshold probability.

Additionally or alternatively, operation 618 may comprise determining a path variance associated with a maneuver based at least in part on a path error model. In some examples, the maneuver may define a canonic line or curve and the variance may be a lateral distance (e.g., a distance orthogonal to the curve) from that curve. Again, determining the variance may be based at least in part on a random weighted selection based at least in part on the probabilities indicated by the path error model. In some examples, a modified maneuver may be determined at a first rate (e.g., at 1 Hz, 0.5 Hz, 10 Hz), whereas the variation in the path may be determined at a second rate that is the same or different than the first rate (e.g., 1 Hz, 10 Hz, 100 Hz, 200 Hz). In at least one example, the first rate may be lower than the second rate (e.g., 1 Hz for the first rate versus 200 Hz for the second rate) so that there may be multiple variations associated with a single modified maneuver such that the vehicle may drift laterally from the modified maneuver. In other words, a maneuver may be chosen every second and a lateral position associated with the maneuver may be modified more frequently than one second.

At operation 620, example process 600 (and/or subprocess 604) may additionally or alternatively comprise tracking previously simulated scenarios and choosing a modification to the predicted maneuver and/or predicted path to simulate an occurrence rate of anomalous behavior modeled by the agent behavior model, according to any of the techniques discussed herein. For example, operation 620 may comprise tracking previous modifications and distributing the modifications chosen to accord with the error model(s) associated with the object type and scenario so that altering the predicted maneuver and/or the predicted path will vary the object's behavior similar to objects in the real world. In other words, the agent behavior model may be used to enforce aberrant behavior occurrences. For example, operation 616 may use random sampling (operation 618) but if upon the n-th iteration operation 618 would result in non-anomalous behavior even though the agent behavior model indicates that a certain kind of anomalous behavior happens once in n instances of a scenario, operation 620 may force the modification to include the anomalous behavior, which may comprise discarding results of operation 618 and directly choosing the behavior for controlling the simulated object.

At operation 622, example process 600 (and/or subprocess 604) may comprise controlling the simulated object based at least in part on the modified maneuver and/or modified path determined based at least in part on operation 618, according to any of the techniques discussed herein.

Example Clauses

A. A method comprising: receiving log data from an autonomous vehicle comprising: sensor data from a sensor associated with the autonomous vehicle traversing an environment; a first detection of an object 313(*a*) associated with a first time; a second detection of the object 313(*b*) associated with a second time and indicative of a location of the object at the second time and a maneuver executed by the object; and a predicted maneuver the object is to execute and a predicted location of the object at the second time generated at a time prior to the second time; determining a maneuver error model and a path error model based at least in part on determining a difference between the predicted maneuver and the maneuver executed by the object and a distance between the predicted location and the location of the object at the second time; instantiating, in a simulated environment, a simulated representation of the object; determining a predicted movement of the simulated representation of the object; and controlling motion of the simulated representation of the object based at least in part on modifying the predicted movement using the maneuver error model and the path error model.

B. The method of paragraph A, wherein modifying the predicted movement comprises: determining one or more parameters associated with the simulated environment; determining, based at least in part on the one or more parameters, the predicted movement, and the maneuver error model, an error associated with the prediction; and altering the predicted movement based at least in part on the error.

C. The method of either paragraph A or B, wherein modifying the predicted movement comprises at least one of: determining a modified maneuver from among multiple maneuvers associated with the maneuver error model based at least in part on a first probability indicated by the maneuver error model and associated with the modified maneuver; or determining a modified path based at least in part on determining a lateral variation from the modified maneuver based at least in part on a probability indicated by the path error model.

D. The method of any one of paragraphs A-C, wherein: modifying the predicted movement comprises determining a modified maneuver; and the modified maneuver comprises an indication of at least one of: executing a turn; executing a lane change; reversing; parking; executing a passing maneuver; entering or exiting a roadway, crosswalk, sidewalk, or a segregated lane; maintaining a current motion; or executing a stop.

E. The method of any one of paragraphs A-D, wherein: determining the maneuver error model comprises: determining, based at least in part on the log data, a first number of instances in which the predicted maneuver similar to the maneuver; and determining, based at least in part on the log data, a second number instances associated with a different maneuver that was executed by the object instead of the predicted maneuver; and determining the path error model comprises: determining, based at least in part on the log data, a third number of times that the object was located at the distance from a trajectory associated with the predicted maneuver.

F. The method of any one of paragraphs A-E, wherein determining at least one of the maneuver error model or the path error model further comprises: determining, based at least in part on the sensor data, one or more parameters associated with the environment; and determining a cluster of the plurality of error models based at least in part on the one or more parameters.

G. A system comprising: one or more processors; and a memory storing processor-executable instructions that, when executed by the one or more processors, cause the system to perform operations comprising: receiving log data from an autonomous vehicle comprising: sensor data from a sensor associated with the autonomous vehicle traversing an environment; a first detection of an object associated with a first time; a second detection of the object associated with a second time and indicative of a location of the object at the second time and a maneuver executed by the object; and a predicted maneuver the object is to execute and a predicted location of the object at the second time generated at a time prior to the second time; determining a maneuver error model and a path error model based at least in part on determining a difference between the predicted maneuver and the maneuver executed by the object and a distance between the predicted location and the location of the object at the second time; instantiating, in a simulated environment, a simulated representation of the object; determining a predicted movement of the simulated representation of the object; and controlling motion of the simulated representation of the object based at least in part on modifying the predicted movement using the maneuver error model and the path error model.

H. The system of paragraph G, wherein modifying the predicted movement comprises: determining one or more parameters associated with the simulated environment; determining, based at least in part on the one or more parameters, the predicted movement, and the maneuver error model, an error associated with the prediction; and altering the predicted movement based at least in part on the error.

I. The system of either paragraph G or H, wherein modifying the predicted movement comprises at least one of: determining a modified maneuver from among multiple maneuvers associated with the maneuver error model based at least in part on a first probability indicated by the maneuver error model and associated with the modified maneuver; or determining a modified path based at least in part on determining a lateral variation from the modified maneuver based at least in part on a probability indicated by the path error model.

J. The system of any one of paragraphs G-I, wherein: modifying the predicted movement comprises determining a modified maneuver; and the modified maneuver comprises an indication of at least one of: executing a turn; executing a lane change; reversing; parking; executing a passing maneuver; entering or exiting a roadway, crosswalk, sidewalk, or a segregated lane; maintaining a current motion; or executing a stop.

K. The system of any one of paragraphs G-J, wherein: determining the maneuver error model comprises: determining, based at least in part on the log data, a first number of instances in which the predicted maneuver similar to the maneuver; and determining, based at least in part on the log data, a second number instances associated with a different maneuver that was executed by the object instead of the predicted maneuver; and determining the path error model comprises: determining, based at least in part on the log data, a third number of times that the object was located at the distance from a trajectory associated with the predicted maneuver.

L. The system of any one of paragraphs G-K, wherein determining at least one of the maneuver error model or the path error model further comprises: determining, based at least in part on the sensor data, one or more parameters associated with the environment; and determining a cluster of the plurality of error models based at least in part on the one or more parameters.

M. The system of any one of paragraphs G-L, wherein the operations further comprises at least one of controlling a simulated vehicle or the autonomous vehicle based at least in part on the motion of the simulated representation.

N. A non-transitory computer-readable medium storing processor-executable instructions that, when executed by one or more processors, cause the one or more processors to perform operations comprising: receiving log data from an autonomous vehicle comprising: sensor data from a sensor associated with the autonomous vehicle traversing an environment; a first detection of an object associated with a first time; a second detection of the object associated with a second time and indicative of a location of the object at the second time and a maneuver executed by the object; and a predicted maneuver the object is to execute and a predicted location of the object at the second time generated at a time prior to the second time; determining a maneuver error model and a path error model based at least in part on determining a difference between the predicted maneuver and the maneuver executed by the object and a distance between the predicted location and the location of the object at the second time; instantiating, in a simulated environment, a simulated representation of the object; determining a predicted movement of the simulated representation of the object; and controlling motion of the simulated representation of the object based at least in part on modifying the predicted movement using the maneuver error model and the path error model.

O. The non-transitory computer-readable medium of paragraph N, wherein modifying the predicted movement comprises: determining one or more parameters associated with the simulated environment; determining, based at least in part on the one or more parameters, the predicted movement, and the maneuver error model, an error associated with the prediction; and altering the predicted movement based at least in part on the error.

P. The non-transitory computer-readable medium of paragraph O, wherein modifying the predicted movement comprises at least one of: determining a modified maneuver from among multiple maneuvers associated with the maneuver error model based at least in part on a first probability indicated by the maneuver error model and associated with the modified maneuver; or determining a modified path based at least in part on determining a lateral variation from the modified maneuver based at least in part on a probability indicated by the path error model.

Q. The non-transitory computer-readable medium of any one of paragraphs N-P, wherein: modifying the predicted movement comprises determining a modified maneuver; and the modified maneuver comprises an indication of at least one of: executing a turn; executing a lane change; reversing; parking; executing a passing maneuver; entering or exiting a roadway, crosswalk, sidewalk, or a segregated lane; maintaining a current motion; or executing a stop.

R. The non-transitory computer-readable medium of any one of paragraphs N-Q, wherein: determining the maneuver error model comprises: determining, based at least in part on the log data, a first number of instances in which the predicted maneuver similar to the maneuver; and determining, based at least in part on the log data, a second number instances associated with a different maneuver that was executed by the object instead of the predicted maneuver; and determining the path error model comprises: determining, based at least in part on the log data, a third number of times that the object was located at the distance from a trajectory associated with the predicted maneuver.

S. The non-transitory computer-readable medium of any one of paragraphs N-R, wherein determining at least one of the maneuver error model or the path error model further comprises: determining, based at least in part on the sensor data, one or more parameters associated with the environment; and determining a cluster of the plurality of error models based at least in part on the one or more parameters.

T. The non-transitory computer-readable medium of any one of paragraphs N-S, wherein the operations further comprises at least one of controlling a simulated vehicle or the autonomous vehicle based at least in part on the motion of the simulated representation.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    receiving log data from an autonomous vehicle comprising:
        sensor data from a sensor associated with the autonomous vehicle traversing an environment;
        a first detection of an object associated with a first time;
        a second detection of the object associated with a second time and indicative of a location of the object at the second time and a maneuver executed by the object; and
        a predicted maneuver associated with the object and a predicted location of the object at the second time generated at a time prior to the second time;
    determining a maneuver error model and a path error model based at least in part on determining a difference between the predicted maneuver and the maneuver executed by the object and a distance between the predicted location and the location of the object at the second time;
    instantiating, in a simulated environment, a simulated representation of the object;
    determining a predicted movement of the simulated representation of the object; and
    controlling motion of the simulated representation of the object based at least in part on modifying the predicted movement using the maneuver error model and the path error model.

2. The method of claim 1, wherein modifying the predicted movement comprises:
    determining one or more parameters associated with the simulated environment;
    determining, based at least in part on the one or more parameters, the predicted movement, and the maneuver error model, an error associated with the predicted movement; and
    altering the predicted movement based at least in part on the error.

3. The method of claim 1, wherein modifying the predicted movement comprises at least one of:
    determining a modified maneuver from among multiple maneuvers associated with the maneuver error model based at least in part on a first probability indicated by the maneuver error model and associated with the modified maneuver; or
    determining a modified path based at least in part on determining a lateral variation from the modified maneuver based at least in part on a probability indicated by the path error model.

4. The method of claim 1, wherein:
modifying the predicted movement comprises determining a modified maneuver; and
the modified maneuver comprises an indication of at least one of:
- executing a turn;
- executing a lane change;
- reversing;
- parking;
- executing a passing maneuver;
- entering or exiting a roadway, crosswalk, sidewalk, or a segregated lane;
- maintaining a current motion; or
- executing a stop.

5. The method of claim 1, wherein:
determining the maneuver error model comprises:
- determining, based at least in part on the log data, a first number of instances in which the predicted maneuver similar to the maneuver; and
- determining, based at least in part on the log data, a second number instances associated with a different maneuver that was executed by the object instead of the predicted maneuver; and determining the path error model comprises:
- determining, based at least in part on the log data, a third number of times that the object was located at the distance from a trajectory associated with the predicted maneuver.

6. The method of claim 1, wherein determining at least one of the maneuver error model or the path error model further comprises:
- determining, based at least in part on the sensor data, one or more parameters associated with the environment; and
- determining a cluster of a plurality of error models based at least in part on the one or more parameters.

7. A system comprising:
one or more processors; and
a memory storing processor-executable instructions that, when executed by the one or more processors, cause the system to perform operations comprising:
receiving log data from an autonomous vehicle comprising:
- sensor data from a sensor associated with the autonomous vehicle traversing an environment;
- a first detection of an object associated with a first time;
- a second detection of the object associated with a second time and indicative of a location of the object at the second time and a maneuver executed by the object; and
- a predicted maneuver associated with the object and a predicted location of the object at the second time generated at a time prior to the second time;
determining a maneuver error model and a path error model based at least in part on determining a difference between the predicted maneuver and the maneuver executed by the object and a distance between the predicted location and the location of the object at the second time;
instantiating, in a simulated environment, a simulated representation of the object;
determining a predicted movement of the simulated representation of the object; and
controlling motion of the simulated representation of the object based at least in part on modifying the predicted movement using the maneuver error model and the path error model.

8. The system of claim 7, wherein modifying the predicted movement comprises:
- determining one or more parameters associated with the simulated environment;
- determining, based at least in part on the one or more parameters, the predicted movement, and the maneuver error model, an error associated with the predicted action; and
- altering the predicted movement based at least in part on the error.

9. The system of claim 7, wherein modifying the predicted movement comprises at least one of:
- determining a modified maneuver from among multiple maneuvers associated with the maneuver error model based at least in part on a first probability indicated by the maneuver error model and associated with the modified maneuver; or
- determining a modified path based at least in part on determining a lateral variation from the modified maneuver based at least in part on a probability indicated by the path error model.

10. The system of claim 7, wherein:
modifying the predicted movement comprises determining a modified maneuver; and
the modified maneuver comprises an indication of at least one of:
- executing a turn;
- executing a lane change;
- reversing;
- parking;
- executing a passing maneuver;
- entering or exiting a roadway, crosswalk, sidewalk, or a segregated lane;
- maintaining a current motion; or
- executing a stop.

11. The system of claim 7, wherein:
determining the maneuver error model comprises:
- determining, based at least in part on the log data, a first number of instances in which the predicted maneuver similar to the maneuver; and
- determining, based at least in part on the log data, a second number instances associated with a different maneuver that was executed by the object instead of the predicted maneuver; and determining the path error model comprises:
- determining, based at least in part on the log data, a third number of times that the object was located at the distance from a trajectory associated with the predicted maneuver.

12. The system of claim 7, wherein determining at least one of the maneuver error model or the path error model further comprises:
- determining, based at least in part on the sensor data, one or more parameters associated with the environment; and
- determining a cluster of a plurality of error models based at least in part on the one or more parameters.

13. The system of claim 7, wherein the operations further comprises at least one of controlling a simulated vehicle or the autonomous vehicle based at least in part on the motion of the simulated representation.

14. A non-transitory computer-readable medium storing processor-executable instructions that, when executed by one or more processors, cause the one or more processors to perform operations comprising:

receiving log data from an autonomous vehicle comprising:

sensor data from a sensor associated with the autonomous vehicle traversing an environment;

a first detection of an object associated with a first time;

a second detection of the object associated with a second time and indicative of a location of the object at the second time and a maneuver executed by the object; and a predicted maneuver associated with the object and a predicted location of the object at the second time generated at a time prior to the second time;

determining a maneuver error model and a path error model based at least in part on determining a difference between the predicted maneuver and the maneuver executed by the object and a distance between the predicted location and the location of the object at the second time;

instantiating, in a simulated environment, a simulated representation of the object;

determining a predicted movement of the simulated representation of the object; and controlling motion of the simulated representation of the object based at least in part on modifying the predicted movement using the maneuver error model and the path error model.

15. The non-transitory computer-readable medium of claim 14, wherein modifying the predicted movement comprises:

determining one or more parameters associated with the simulated environment;

determining, based at least in part on the one or more parameters, the predicted movement, and the maneuver error model, an error associated with the predicted action; and altering the predicted movement based at least in part on the error.

16. The non-transitory computer-readable medium of claim 15, wherein modifying the predicted movement comprises at least one of:

determining a modified maneuver from among multiple maneuvers associated with the maneuver error model based at least in part on a first probability indicated by the maneuver error model and associated with the modified maneuver; or determining a modified path based at least in part on determining a lateral variation from the modified maneuver based at least in part on a probability indicated by the path error model.

17. The non-transitory computer-readable medium of claim 14, wherein:

modifying the predicted movement comprises determining a modified maneuver; and the modified maneuver comprises an indication of at least one of:

executing a turn;

executing a lane change;

reversing;

parking;

executing a passing maneuver;

entering or exiting a roadway, crosswalk, sidewalk, or a segregated lane;

maintaining a current motion; or executing a stop.

18. The non-transitory computer-readable medium of claim 14, wherein:

determining the maneuver error model comprises:

determining, based at least in part on the log data, a first number of instances in which the predicted maneuver similar to the maneuver; and determining, based at least in part on the log data, a second number instances associated with a different maneuver that was executed by the object instead of the predicted maneuver; and determining the path error model comprises:

determining, based at least in part on the log data, a third number of times that the object was located at the distance from a trajectory associated with the predicted maneuver.

19. The non-transitory computer-readable medium of claim 14, wherein determining at least one of the maneuver error model or the path error model further comprises:

determining, based at least in part on the sensor data, one or more parameters associated with the environment; and determining a cluster of a plurality of error models based at least in part on the one or more parameters.

20. The non-transitory computer-readable medium of claim 14, wherein the operations further comprises at least one of controlling a simulated vehicle or the autonomous vehicle based at least in part on the motion of the simulated representation.

* * * * *